US011480737B1

(12) United States Patent
Sylvester et al.

(10) Patent No.: US 11,480,737 B1
(45) Date of Patent: Oct. 25, 2022

(54) TUNABLE WAVELENGTH-SELECTIVE FIBER OPTIC SWITCH EMPLOYING MOVEABLE GRATING INTERACTION WITH THE EVANESCENT FIELD OF A PARTIALLY-CLADDING-REMOVED FIBER

(71) Applicant: General Dynamics Mission Systems, Inc., Fairfax, VA (US)

(72) Inventors: Garrett Smith Sylvester, Fairfax, VA (US); David L. K. Eng, Fairfax, VA (US); M. Craig Swan, Fairfax, VA (US)

(73) Assignee: General Dynamics Mission Systems, Inc.

( * ) Notice: Subject to any disclaimer, the term of this patent is extended or adjusted under 35 U.S.C. 154(b) by 0 days.

(21) Appl. No.: 17/410,948

(22) Filed: Aug. 24, 2021

(51) Int. Cl.
*G02B 6/35* (2006.01)

(52) U.S. Cl.
CPC ......... *G02B 6/3534* (2013.01); *G02B 6/3536* (2013.01); *G02B 6/359* (2013.01)

(58) Field of Classification Search
None
See application file for complete search history.

(56) References Cited

U.S. PATENT DOCUMENTS

| 4,082,425 A * | 4/1978 | Miller ...................... G02B 6/30 385/37 |
| 2002/0076150 A1 * | 6/2002 | Zhao .................. G02B 6/29332 385/39 |
| 2003/0077031 A1 * | 4/2003 | Zhang ................... G02B 6/124 385/24 |
| 2003/0108290 A1 * | 6/2003 | Zhang .................. G02B 6/3536 385/24 |
| 2003/0179998 A1 * | 9/2003 | Zhang ................ G02B 6/29334 385/25 |

* cited by examiner

*Primary Examiner* — Jerry Rahll
(74) *Attorney, Agent, or Firm* — LKGlobal | Lorenz & Kopf, LLP

(57) ABSTRACT

In the wavelength selective fiber optic switch, an optical fiber with a portion of cladding removed defines a window facilitating access to the radially evanescent field present when optical power is propagating through the optical fiber, defining a first transmission path. The cladding removed optical fiber, a secondary optical waveguide, and a grating structure form a grating assisted coupler. An adjustable positioning fixture changes the relative spacing of the fiber core, grating, and output waveguide between a decoupled position and a coupled position. The switch operates, in the decoupled position, to allow optical power to propagate unperturbed through the first transmission path, including optical power at said optical wavelength, and in the coupled position, to extract and reroute optical power at the optical wavelength to propagate through the second transmission path, while leaving unperturbed other wavelengths propagating through the first transmission path. A tuning mechanism is implemented that alters the periodic properties of the grating to tune to a desired optical wavelength.

18 Claims, 8 Drawing Sheets

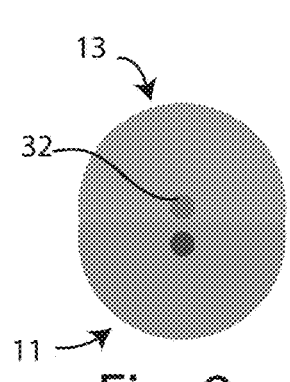 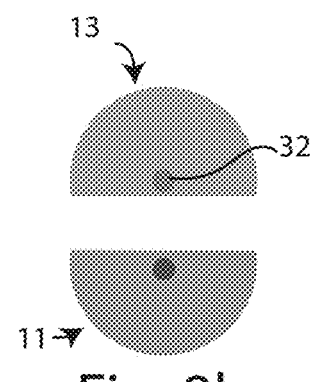 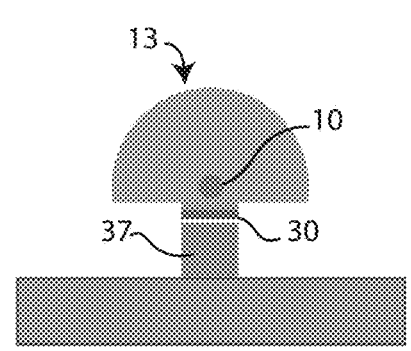
Fig. 9a  Fig. 9b  Fig. 9c
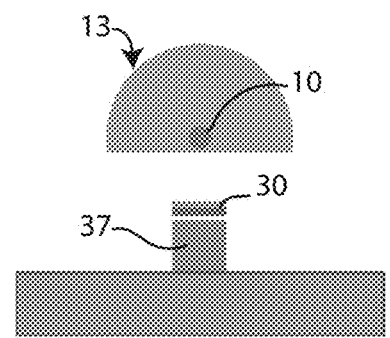
Fig. 9d

TUNABLE WAVELENGTH-SELECTIVE FIBER OPTIC SWITCH EMPLOYING MOVEABLE GRATING INTERACTION WITH THE EVANESCENT FIELD OF A PARTIALLY-CLADDING-REMOVED FIBER

TECHNICAL FIELD

This disclosure relates generally to fiber optic communication. More particularly, the disclosure relates to a wavelength-selective fiber optic switch.

BACKGROUND

This section provides background information related to the present disclosure which is not necessarily prior art.

Modern fiber optic communication systems send data over many different channels corresponding to different optical wavelengths. To control individual channels, such as to switch a channel on and off, or to route signals over different transmission paths, high-fidelity wavelength-selective switches are needed in order to control the desired channel without affecting the channels at other wavelengths.

To achieve this, conventional wavelength-selective optical switches typically comprise separate physical devices that are inserted into the optical path. The conventional approaches can be convoluted, expensive, physically large, challenging to integrate and come with various performance tradeoffs (insertion loss, tunability challenges and the like).

SUMMARY

The disclosed technology takes a different approach to providing a wavelength-selective optical switch. The optical switch is small in size and offers low insertion loss. Using the disclosed techniques, the wavelength-selective switch is capable of removing a selected bandwidth of light, such as would be used for a single channel in an optical communication system, from one optical fiber and coupling it into a second waveguide or fiber. Note that an optical fiber is a specific implementation of a waveguide, and subsequent references to an 'waveguides' should be understood to include fibers, chip-based waveguides, or other optical waveguide embodiments. The principle of operation is grating assisted coupling, wherein narrowband coupling between two waveguides is enabled by the presence of a periodic or quasi-periodic structure such as a grating.

The wavelength-selective optical switch is implemented using an optical fiber, which defines a first transmission path, hereafter referred to as the input fiber. The input fiber is fashioned by removing a portion of the cladding, as by polishing, abrading or other removal processes, to define an access window region through which the air-glass interface is brought nearer the core. Within the window region, the radially evanescent field of the fiber mode is accessible. This radially evanescent field will hereafter be referred to as the evanescent field.

The optical switch further includes a second optical waveguide, which could be another optical fiber or a chip-based waveguide, hereafter referred to as the output waveguide, which defines a second transmission path. The output waveguide is similarly prepared such that the waveguide core is near the air-interface and the evanescent field is accessible. A grating is either written or fabricated directly into the one of the waveguides (input or output) or is a separate structure that is placed in close proximity to one of the waveguides. Various different configurations of grating are possible, including a chip-based waveguide grating embodiment, a Fiber Bragg Grating (FBG) embodiment, or a standalone grating structure. The grating is provided with a predetermined, but alterable, grating pitch corresponding to the wavelength desired to be switched. The two waveguides (input and output) in addition to the grating together form a grating assisted coupler. While the location of the grating can be either in the input waveguide, output waveguide, or a separate standalone structure, for simplicity and clarity, the introductory material will focus on the configuration where the grating is written in the output waveguide structure, which will be referred to as the waveguide grating, though the particular choice of grating location is not intended to limit the scope of the present disclosure.

The output waveguide, grating and the cladding-removed input fiber are physically positioned in a fixture that supports relative movement between the input fiber and waveguide grating. Movement to a first position places the waveguide grating and the input fiber core in a spaced apart relation, so the waveguide grating has little or no electromagnetic interaction with the evanescent field of the input fiber core. Movement to a second position places the waveguide grating in close proximity to the input waveguide core, such that the waveguide grating electromagnetically interacts with the evanescent field of said core, forming a grating assisted coupler and transferring a narrow bandwidth of power from the input fiber to the output waveguide. While a variety of mechanical movement solutions are possible, one solution is to provide an electrically actuated piezoelectric piston to effect movement between the first and second positions.

When switched to the first position, the waveguide grating is substantially non-interacting with the evanescent field. In this state, the optical power, at all wavelengths present, propagates through the optical fiber (along the first transmission path) with near zero insertion loss. The energy in the radially evanescent field, though outside of the fiber core, remains bound to the fiber mode and does not result in any power attenuation unless perturbed by an externally introduced object.

When switched to the second position, the waveguide grating substantially interacts with the evanescent field of the input fiber, resulting in grating assisted coupling. As a result of this interaction, the optical power at the design wavelength is prevented from propagating further through the input fiber in the forward direction (along the first transmission path)—effectively switching OFF the optical signal propagating in the input fiber at the design wavelength. However, at the design wavelength, electromagnetic interaction between the evanescent field and the waveguide grating causes optical power at the design wavelength to cross-couple from the input fiber to the output waveguide that defines the second transmission path, with the pitch of the periodic structure determining whether that's in the forward or reverse direction. For simplicity and clarity of discussion, the introductory material will focus on the configuration where the grating period couples the light in the reverse direction in the second transmission path, though the particular choice of coupling direction is not intended to limit the scope of the present disclosure.

Propagating optical energy is introduced into an input fiber that has a portion of the cladding removed to define a window for accessing the evanescent field when the optical energy is present. The relationship between the coupled optical wavelength and the grating periodicity is expressed by the Bragg equation:

$$\Lambda_B = \Lambda(n_{in} - n_{out})$$

Here $\Lambda_B$ is the Bragg wavelength (our selected wavelength), $\Lambda$ is the period or pitch of the physical grating, $n_{in}$ is the effective index of the input fiber, and $n_{out}$ is the effective index of the output waveguide. Note that the above equation is for the first order grating response: higher orders exist and could also be used in this application. The waveguide grating, having a defined period $\Lambda$, is (a) selectively introduced into the evanescent field such that interaction between the grating and the evanescent field results in transfer of power at the Bragg wavelength from the input fiber to the output waveguide. The grating is (b) selectively moved substantially out of the evanescent field such that substantial interaction between the grating and the evanescent field does not occur at the Bragg, or other, wavelengths and the optical power remains unperturbed in the input fiber. Through such selective movement of the grating into and out of proximity with the evanescent field the optical signal is cross-coupled to the output waveguide when the grating is interacting (referred to as the cross state) and remains in the input fiber when the grating is not interacting (referred to as the bar state).

BRIEF DESCRIPTION OF THE DRAWINGS

The drawings described herein are for illustrative purposes only of selected embodiments and not all possible implementations. The particular choice of drawings is not intended to limit the scope of the present disclosure.

FIGS. 6a-6b illustrate how to prepare the waveguide grating from an FBG, wherein FIG. 6a is a perspective view illustrating an FBG formed in an optical fiber and wherein FIG. 6b is a cross sectional view of the FBG of FIG. 6a, illustrating a cladding-removed portion;

FIGS. 9a and 9b show the respective "on" and "off" states of an embodiment in which the grating structure is written on the input fiber/waveguide;

FIGS. 9c and 9d show the respective "on" and "off" states of an embodiment in which the grating structure is a separate entity spaced away from both input and output waveguide/fiber structures;

DETAILED DESCRIPTION

Introduction to Optical Fiber

Figure 1:
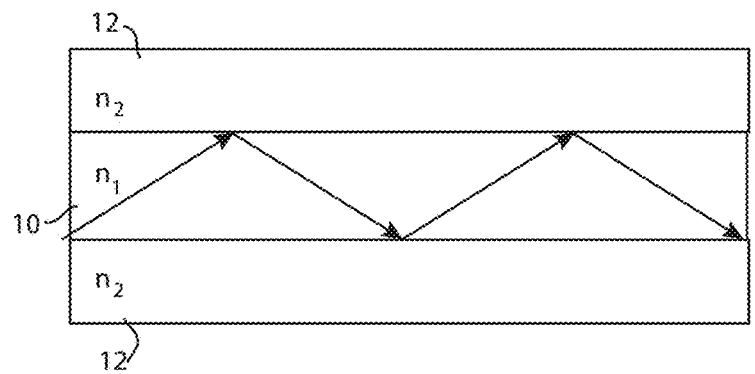
FIG. 1 is a cross section of an optical fiber, useful in understanding the concept of total internal reflection.

To a first approximation, an optical fiber may be thought of as propagating optical power by means of total internal reflection at the boundary between the core and cladding. The concept is illustrated in FIG. 1 in which the core 10 and cladding 12 have distinct refractive indices $n_1$ and $n_2$ respectively. Specifically, the cladding has a slightly lower index of refraction ($n_2$) than the core ($n_1$). Thus the propagation velocity of the light is slower in the core than in the cladding.

As illustrated, a light ray is injected into the optical fiber on the left. If the light ray is injected and strikes the core-to-cladding interface at an angle greater than the critical angle with respect to the normal axis, it is reflected back into the core. Because the angle of incidence is always equal to the angle of reflection, the reflected light continues to be reflected. The light ray then continues bouncing down the length of the optical fiber. If the angle of incidence at the core-to-cladding interface is less than the critical angle, both reflection and refraction take place. Because of refraction at each incidence on the interface, the light beam attenuates and dies off over a certain short distance.

As anyone who has used a prism or studied a rainbow knows, visible daylight, which we might perceive as white, actually contains a spectrum of colors ranging from red to violet (and this is just what the human eye can see). Each of these colors represents a different optical wavelength. In a fiber optic communication system these different wavelengths can be treated as different channels (though a different wavelength range is used in most communication systems), and thus capable of carrying different communication messages.

Although FIG. 1 has illustrated the propagating optical signal as a light ray, the physics of light propagation is actually more complex. Light is composed of photons, which carry the electromagnetic force. The cumulative effect of many photons can be represented as electromagnetic fields, specifically the electric field and the magnetic field, which exhibit wave properties as the light propagates. Also produced is a radially evanescent field, which is important to the operation of the optical switch, as will be discussed more fully below in connection with FIG. 16.

Figure 2:
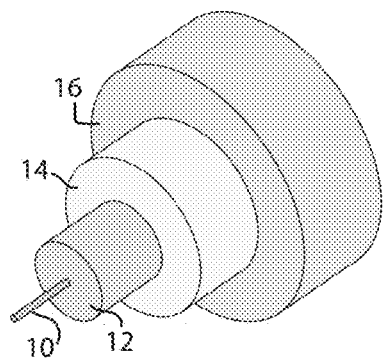
FIG. 2 is a perspective view of an exemplary single-mode optical fiber, encased in a protective buffer coating and outer jacket.

FIG. 2 illustrates an exemplary optical fiber with the core 10 and cladding 12. As discussed above, it is the interface or boundary condition between the core and cladding that is responsible for guiding the optical power through total internal reflection. These optical fibers are typically fabricated from glass that has been suitably doped to exhibit the desired refractive index. For use in a typical communication system, a practical fiber optic cable would also include protective buffer coating 14 and an outer jacket 16. These additional layers strengthen the cable to permit bending without breaking the core or cladding, and also to protect against abrasion. For convenience of illustration, these outer buffer coating and jacket layers have not been shown in the remaining figures.

Cladding-Removed Optical Fiber

Figure 3:
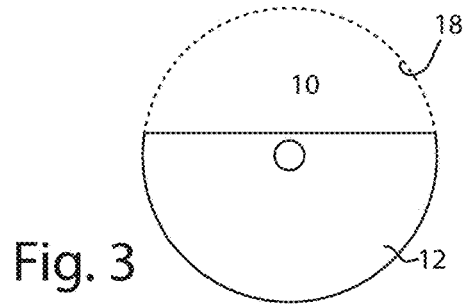
FIG. 3 is an endwise, cross sectional view of the core and cladding portion of a single mode optical fiber, illustrating how the optical fiber is fashioned with a cladding-removed window that brings the core close to the air-glass interface.
Figure 4:
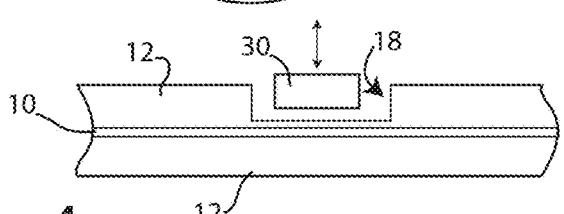
FIG. 4 is a longitudinal, cross sectional view of the optical fiber of FIG. 3, illustrating how the cladding-removed window is defined and further illustrating placement of the waveguide grating.

Referring to FIGS. 3 and 4, a window 18 is fashioned in the optical fiber by removing the cladding 12 as by side polishing, abrading or other technique, to expose the core 10, fully or partially. In one embodiment, as illustrated, the core is not fully 'exposed' after cladding removal, in that there is generally a small remaining layer of cladding between the core and air. This remaining cladding layer is thin enough that the evanescent field can interact with what is on the other side. Thus in the window region the core 10 is nearer the glass air interface. In an alternate embodiment, polishing or abrading may extend fully into the core, thereby exposing the core to air. In both embodiments, due to the comparatively small size of the window 18 relative to the remaining surface area of the optical fiber, the window alone (absent effects of inserted grating discussed below) represents only a slight discontinuity, producing negligible overall power loss through the cable.

Waveguide Grating

In addition to the cladding-removed optical fiber section, the switch also includes a waveguide grating 30 (FIG. 4), sized to fit within window 18, to allow movement away from and into proximity with the cladding-removed optical fiber section. When the waveguide grating is brought into contact with the cladding-removed input fiber a narrow bandwidth of power is transferred from the input fiber to the waveguide grating. This occurs due to grating assisted coupling, a phenomenon in which the phase-mismatched modes of the input fiber and output waveguide are phase-matched at a particular wavelength by virtue of the repeating geometry of the grating. While a stepped profile has been illustrated in the figures, switching may be achieved using gratings featuring other profiles, such as such as sawtooth (blazed) profiles, sinusoidal profiles, chirped profiles and other profiles that need not be strictly periodic. Suppression of side lobes adjacent to the selected wavelength can be accomplished by grating apodization or a similar technique.

The waveguide grating can take different forms, depending on the manufacturing process implemented. In one embodiment, the waveguide grating takes the form of a chip-based waveguide. In this chip-based waveguide embodiment, the grating is etched into the surface of a rib or ridge waveguide, fabricated on a photonic chip. The input optical fiber has a section of its cladding removed, allowing its evanescent field to overlap with that of the chip-WG grating when they are brought into close proximity, which enables coupling. The light that is coupled onto the chip is then coupled off the chip into the output waveguide or fiber via traditional methods such as edge coupling, grating coupling, or other methods. The device is made switchable by mechanically bringing the chip and fiber into and out of contact with each other.

In another embodiment, the waveguide grating can take the form of a cladding removed FBG. In this FBG embodiment, the grating is a custom FBG, written into the core of the second fiber. Both fibers have sections of cladding removed, allowing overlap of the evanescent fields when the fiber cores are brought into close proximity, which enables coupling. The device is made switchable by mechanically bringing the two fibers into and out of contact with each other.

Figure 6A:
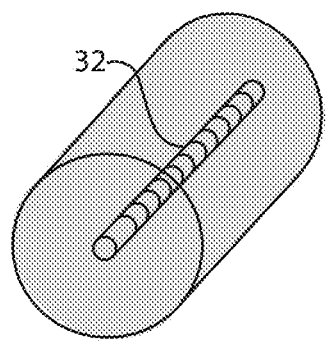
Figure 6B:
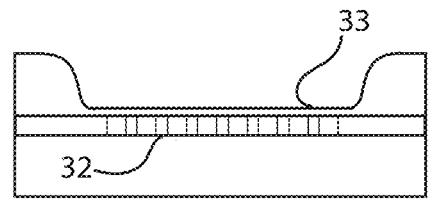

FIGS. 6a and 6b illustrate how a waveguide grating may be fabricated from an optical fiber that has been manufactured with a periodic variation in the refractive index of the core to define an FBG 32. A portion of this FBG is then processed to remove a portion of the cladding, as by side polishing, abrading or other technique, to expose the core, fully or partially. In FIG. 6b this polished area is shown at 33.

Different Embodiments for Location of the Grating Structure

Figure 5A:
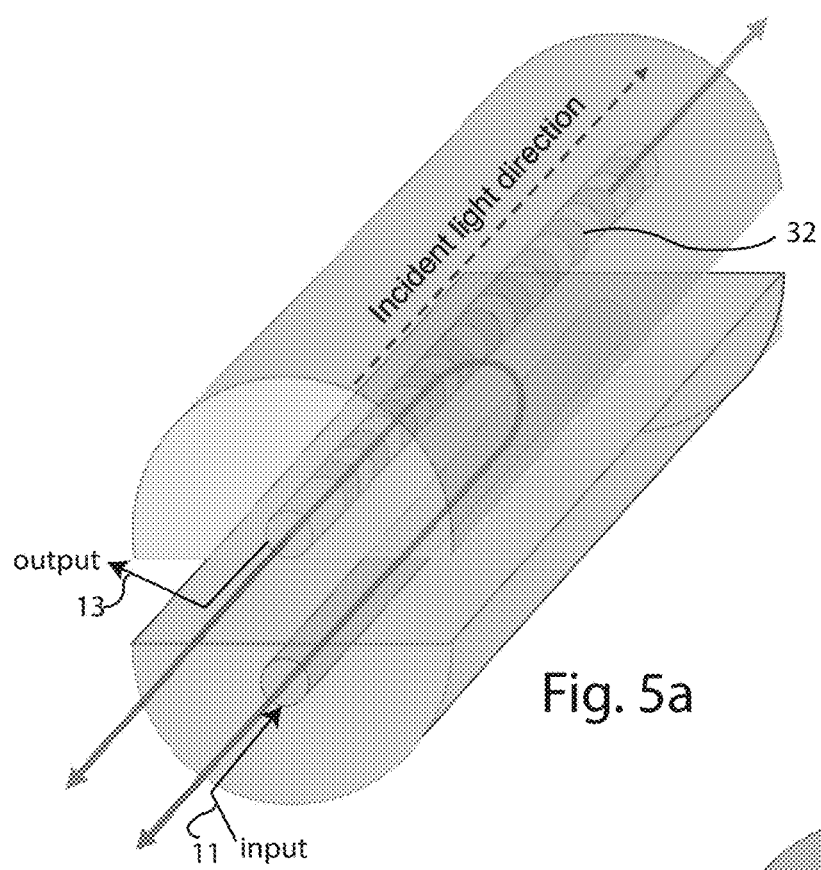
FIG. 5a is an exploded perspective view of the device showing the grating structure on the output fiber/structure—illustrated here as an FBG, but it could be another type of grating structure.

The grating structure can be located or written on either the input fiber/waveguide or the output fiber/waveguide. See FIGS. 9a and 9b, where the input fiber 11 is written with the FBG (although it could alternatively be written on the output fiber 13). FIG. 9a shows the device in the "on" or CLOSED position. FIG. 9b shows the device in the "off" or OPEN position. FIG. 5a illustrates the embodiment of FIGS. 9a and 9b in greater detail, showing the grating structure located on the input fiber/structure 11. In FIG. 5a, the grating structure is shown as an FBG 32, which couples to the output fiber/structure 13 in the CLOSED position. However, a different type of grating structure may also be used. In FIG. 5a, the exploded view highlights the power transfers.

Figure 5B:
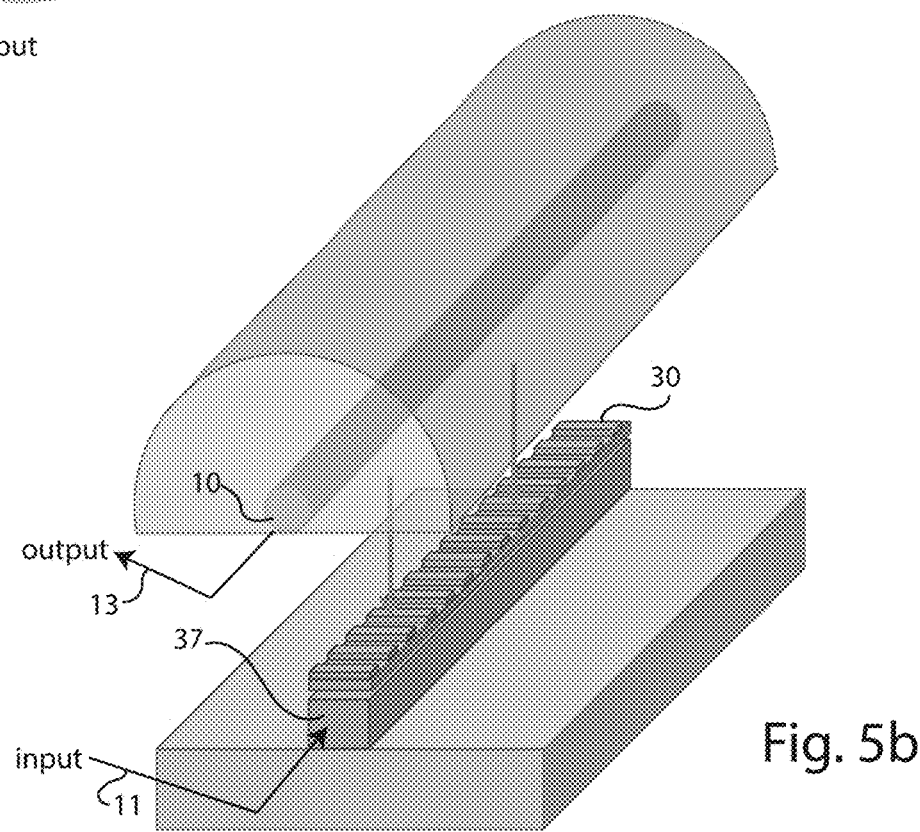
FIG. 5b is an exploded perspective view of the device showing the grating structure as a separate entity spaced away from both input and output waveguide/fiber structures—illustrated here in the "off" or OPEN position.

In another embodiment, shown in FIGS. 9c and 9d, the grating structure 30 may be a separate entity, spaced away from both input 11 and output 13 waveguide/fiber structures (i.e., there is physical separation between the waveguide and either the input or output fiber/waveguide). As illustrated, the grating structure 30 is interposed between the input fiber core 10 and the ridge waveguide 37. FIG. 9c shows the device in the "on" or CLOSED position. FIG. 9d shows the device in the "off" or OPEN position. FIG. 9d also shows more clearly that the grating structure 30 is a separate entity, spaced away from both input and output fiber/waveguide structures. FIG. 5b illustrates the embodiment of FIGS. 9c and 9d in greater detail, showing the grating structure 30 as a separate entity, spaced away from both input fiber core 10 and ridge waveguide 37. In FIG. 5b, the device is shown in the "off" or OPEN position.

Coupler Mounting Techniques

Figure 8:
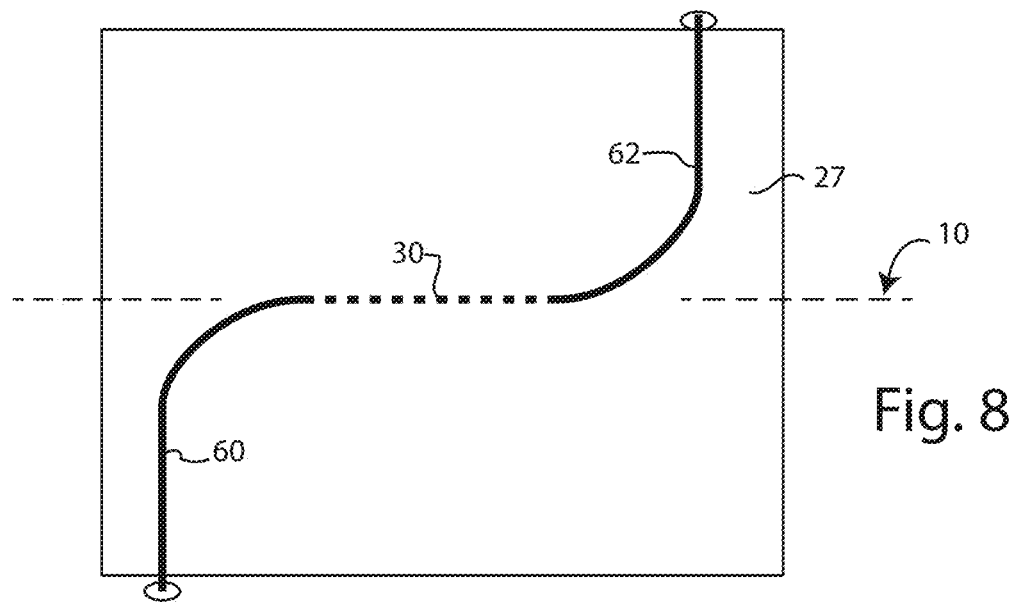
FIG. 8 is a top-down view of a chip-based waveguide grating, illustrating the input and output waveguides associated with the grating.

Referring to FIG. 8, in the chip-based waveguide embodiment, the waveguide grating 30 is fabricated on the substrate 27. Input and output waveguides 60 and 62 extract the backward and forward coupled light, respectively, out of the waveguide grating 30 and may be curved as shown, to bring the input and output waveguides to the sides of the chip, orthogonal to the fiber, the orientation of which is shown by dashed line 10. The fiber core 10 would be oriented in the left-right direction of FIG. 8 and would be brought down (into the page) to make contact when the switch is CLOSED (FIG. 15b).

Figure 7:
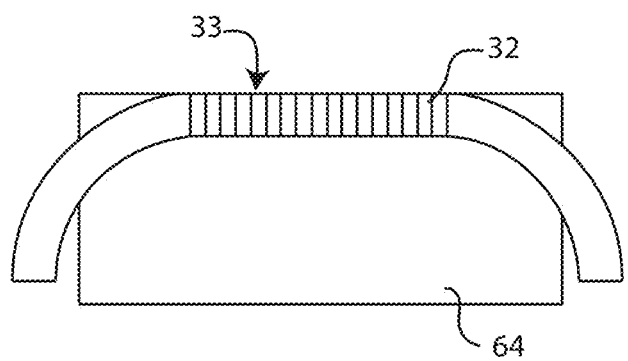
FIG. 7 is a detailed view of an FBG embodiment, showing the fiber seated in a groove cut into a glass block supporting structure.

Referring now to FIG. 7, the FBG-based coupler embodiment may be implemented by seating the FBG 32 in suitably curved groove, cut into a block of material such as glass 64 (FIG. 8). In this way, the fiber 32 naturally curves down and away from the polished surface 33.

Controlled Interaction with Evanescent Field

Figure 10:
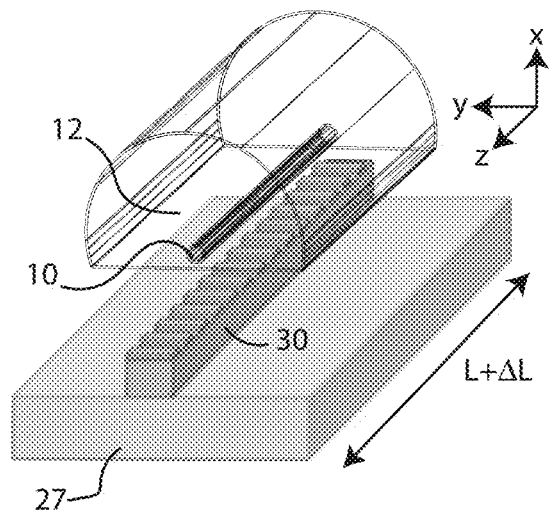
FIG. 10 is a perspective view of the input fiber and chip-based waveguide grating assembly, illustrating the cladding-removed portion of the optical fiber in a decoupled relation to the waveguide grating.
Figure 11:
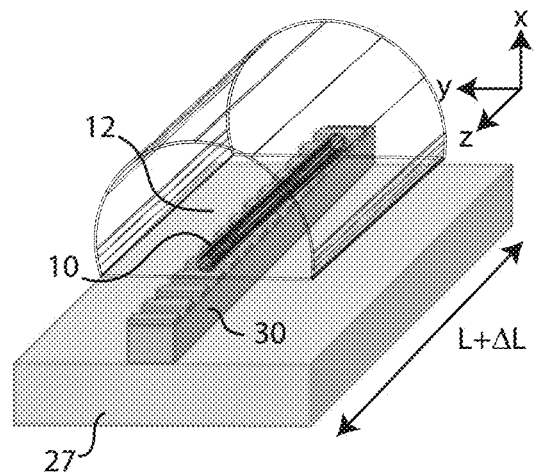
FIG. 11 is a perspective view of the input fiber and chip-based waveguide grating assembly, illustrating the cladding-removed portion of the optical fiber in a coupled relation to the waveguide grating.
Figure 12:
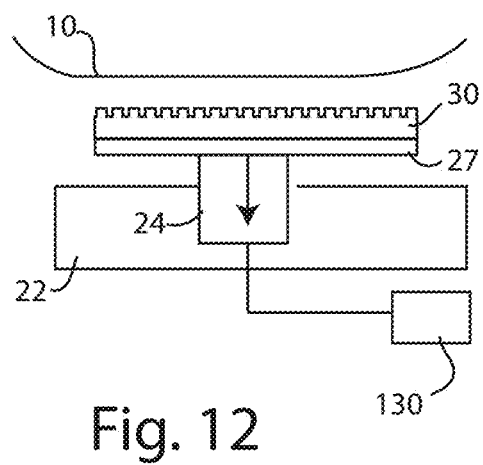
FIG. 12 is a diagrammatic cross-sectional view of the input fiber and waveguide grating assembly, illustrating a fixture for selectively adjusting the core-grating spacing, FIG. 12 specifically showing the spaced apart or decoupled position.
Figure 13:
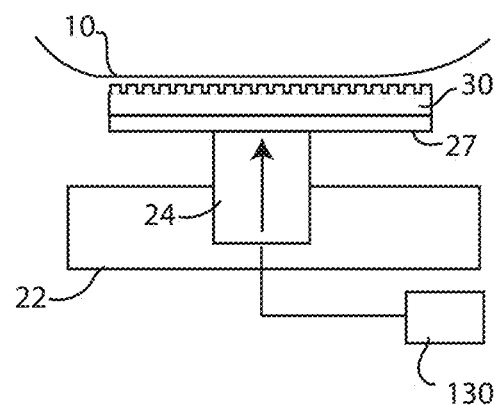
FIG. 13 is a diagrammatic cross-sectional view of the optical fiber and waveguide grating assembly, illustrating a fixture for selectively adjusting the core-grating spacing, FIG. 13 specifically showing the closed or coupled position.

As illustrated diagrammatically in FIGS. 10 and 11, and in FIGS. 12 and 13, the waveguide grating 30 is configured for relative movement, away from and towards the input fiber (movement in the x-direction) using a suitable adjustable positioning fixture 22 (FIGS. 12 and 13). Such movement selectively removes (FIG. 10) and introduces (FIG. 11) interaction between the grating and the evanescent field produced by optical energy within the window region. Such movement is provided by a suitable mechanical device such as an electrically actuated piezoelectric piston 24 as shown in FIGS. 12 and 13.

The basic principle of the movement mechanism is illustrated in FIGS. 12 and 13, showing the adjustable positioning fixture 22 supporting a piezoelectric piston 24 which retracts the waveguide grating 30 away from the core 10 (FIG. 12) and extends the grating 30 towards the core 10 (FIG. 13). An electronic control circuit 130 energizes the piezoelectric piston to effect this movement. Other mechanisms for producing such movement are also possible. In FIGS. 12 and 13 the core 10 has been shown diagrammatically to represent the cladding-removed portion of the optical fiber.

Switching Action

The wavelength-selective optical switch works on the principle that broadband coupling between two dissimilar waveguides (fiber and waveguide grating) is suppressed due to a large phase mismatch. However, the periodically varying geometry of the grating allows narrowband coupling by providing phase matching at a specified wavelength. This effect is present when the fiber and grating are brought together such that the device is in the switch CLOSED position, as represented by the plots in FIG. 14, which correspond to the diagram after the motion indicated by the downward arrows has been completed.

Figure 14:
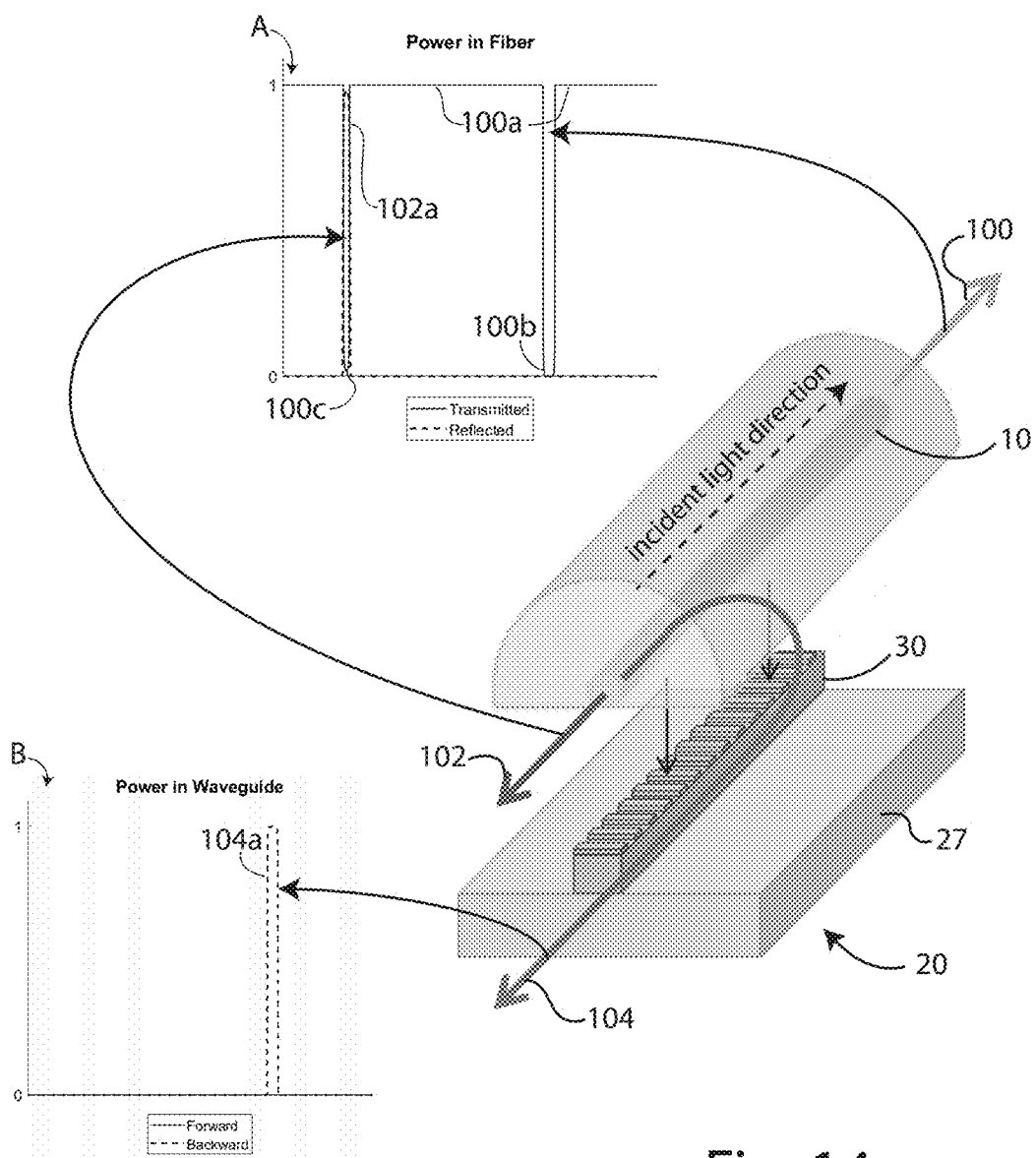
FIG. 14 is a perspective view of the optical fiber and chip-based waveguide grating assembly, showing how wavelength-selective signal routing is carried out through the input fiber and waveguide grating with the switch in its coupled position. Note that the diagram shows the switch in the OPEN position for visual clarity, while the inset graphs show operation in the CLOSED position shown in FIG. 11. The downward pointing arrows indicate movement from the OPEN to CLOSED position.

Referring to FIG. 14, the wavelength-dependent behavior of the switch in the CLOSED position is depicted by graphs A and B. Graph A illustrates the wavelength-dependent propagation conditions within the core 10 of the input fiber. Graph B illustrates the wavelength-dependent propagation conditions within the waveguide grating 30.

Within core 10 of the optical fiber, Graph A of FIG. 14 shows the optical power as a function of wavelength, comparing transmitted power in the optical fiber (at 100a) versus back-reflected power in the optical fiber (at 102a). Transmitted power propagates in the core 10 of the optical fiber in the direction shown by arrow 100. Reflected power propagates in the core 10 in the backwards direction, shown by arrow 102. Note the pronounced reduction or null in the transmitted power at the wavelength corresponding the Bragg wavelength, as at 100b. Note that the reflection peak 102a and corresponding transmission dip 100c can be designed to fall outside of the input power spectrum, meaning there will be no power to reflect or suppress at that wavelength.

Meanwhile, within the waveguide grating, Graph B shows the optical power as a function of wavelength, illustrating the cross-coupled power into the grating 104a (which travels in the backward direction indicated by arrow 104). Note the pronounced peak in backward propagating (coupled) power at the Bragg wavelength, as at 104b, which corresponds to the null in the transmitted fiber power at 100b.

These plots graphically show that at the grating wavelength, the grating will selectively turn off, or divert, a forward-propagating optical signal of the same wavelength, as defined by the Bragg equation, when the grating is touching or in very near proximity to the surface of the core (i.e. coupled to the evanescent field). Concurrent with turning off the forward propagating optical signal at the Bragg wavelength (as defined by the Bragg equation) along the first propagation path, a backward propagating optical signal of the same wavelength is caused to propagate in the waveguide along the second propagation path associated with the waveguide grating.

However, when the grating is moved away from the core until it is out of the evanescent field, the grating has virtually no effect on optical signals propagating in the first propagation path. The distance required to switch between the on and off states can be quite small. In a single mode optical fiber, the distance to move the grating between the ON and OFF state is on the order of a micron.

Figure 15A:
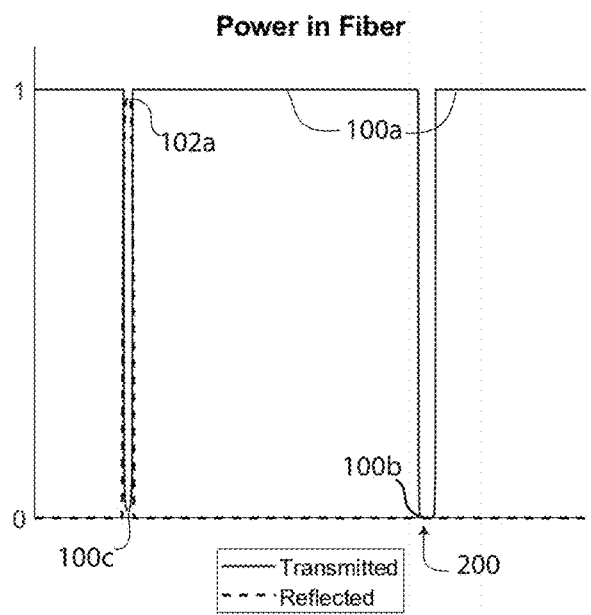
FIG. 15a is a graph comparing the transmitted and reflected power in the fiber, with transmitted power shown by solid line and reflected power shown by dotted line.
Figure 15B:
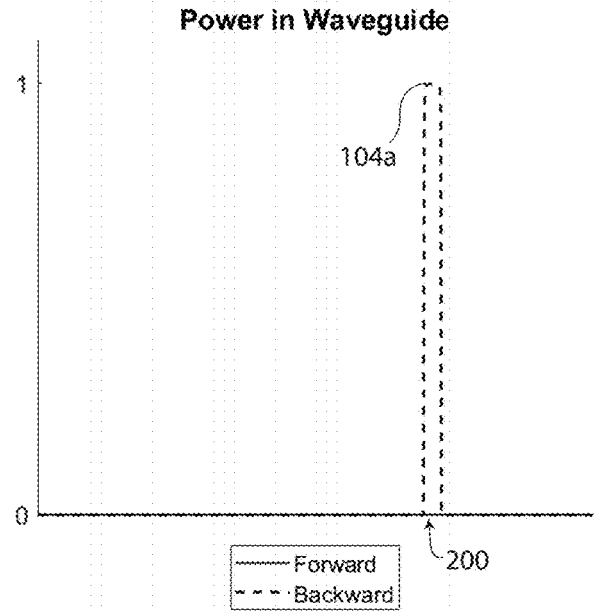
FIG. 15b is a graph comparing the power in the waveguide, with forward power shown by solid line and reflected power shown by dotted line.

The operation of the wavelength-selective switch may be summarized with reference to FIGS. 15a and 15b. Specifically, FIG. 15a shows the state of power flow in the optical fiber, and FIG. 15b shows the state of power flow in the waveguide, both when the switch is in the CLOSED position. As can be seen in the respective graphs, wavelength selective switching occurs at the Bragg wavelength, as at 200: transmitted power in the fiber is effectively switched "off" and backward power in the waveguide is effectively switched "on." For wavelengths other than the Bragg wavelength, essentially no power propagates in the waveguide. The other signal at 102a/100c in FIG. 15a corresponds to back reflection within the fiber and lies outside the wavelength range of interest.

The Evanescent Field

Figure 16:
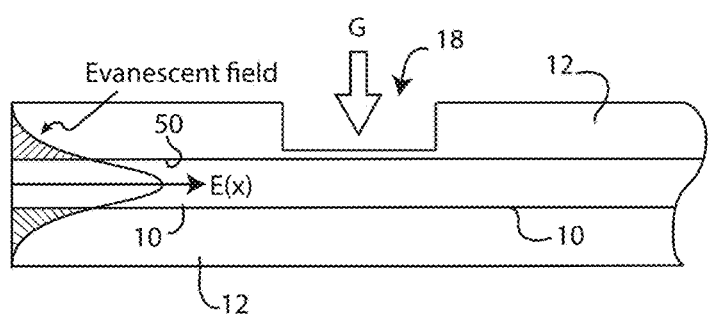
FIG. 16 is a graphical representation of the radially evanescent field shown in relation to an optical cable having a cladding-removed portion at which the evanescent field may interact with a grating.

FIG. 16 diagrammatically illustrates the nature of this radially evanescent field. FIG. 16 depicts the optical fiber core 10 and cladding 12 with window 18 where the waveguide grating may be positioned to interact with the evanescent field as at G. The optical power propagates from left to right in FIG. 16, as an electromagnetic wave guided by the boundary 50 between core and cladding. The propagating electromagnetic wave comprises reciprocally related, time varying electric and magnetic fields, the vector cross product of which defines the directional energy flux (the energy transferred by the optical power per unit area per unit time). This relationship is described by the Poynting vector S (a vector quantity), where E is the electric field vector, H represents the magnetic field vector and × represents the cross-product operator:

$$E \times H = S$$

This propagating electromagnetic wave travels at the speed of light (with suitable correction for the permeability, permittivity, and waveguiding characteristics of the medium through which the wave travels). This propagating wave can travel great distances—as visible starlight will attest. As the wave propagates, the E-field and H-field remain in the same relationship, reciprocally related and oriented spatially at right angles to each other.

The evanescent field is of a fundamentally different character than the reciprocally related propagating electromagnetic E- and H-fields. The evanescent field is predominately a near field phenomenon and rapidly decays to zero in the direction normal to the fiber axis, i.e. radially, with increasing distance from the core-clad boundary. Specifically, the evanescent field has a rapidly decaying field amplitude that exists outside the fiber core. Thus, suitably configured objects placed in the evanescent field can interact with the evanescent field and reflect energy at certain wavelengths back towards the energy source. This is essentially what the grating does, when placed within the evanescent field.

Grating Tunability

If desired, the grating may also be manufactured to expand and contract (in the z-direction of FIGS. 10 and 11) to change the grating period $\Lambda$ and thereby change the selected switching wavelength. Such expansion and contraction may be effected by physically stretching or contracting the length of grating in a direction parallel to the axis of the grating, by an amount $\Delta L$, which can be either positive or negative. The untuned grating length is $L=N\Lambda$ where N is the number of grating periods and remains unchanged by stretching or compression. Therefore, stretching or compressing the grating to a length of $L+\Delta L$ corresponds to a grating period of $\Lambda+\Delta\Lambda$, which translates to a new selected wavelength of $\lambda+\Delta\lambda$.

Figure 17:
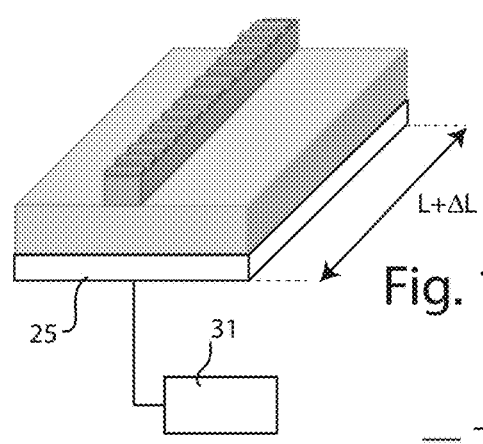
FIG. 17 illustrates one embodiment for selective grating tunability, featuring expansion and contraction (stretching and compression) of the grating structure by mechanical and/or thermal means.

As illustrated in FIG. 17, tunability may be provided for example by employing a heating and/or cooling device in thermal contact with the grating to produce expansion and contraction of the grating. Alternatively, or additionally, a mechanical stretcher or compressor may be used. By expanding or stretching the grating, a longer wavelength is selected; by contracting or compressing, a shorter wavelength is selected. A thermal device 25 controlled by electric current source 31 is illustrated in FIG. 17 as an example. Tuning through a range of different grating periods may also be accomplished by rotation of the grating relative to the fiber, and/or by changing the refractive index of the material of which the grating is made.

Figure 18:
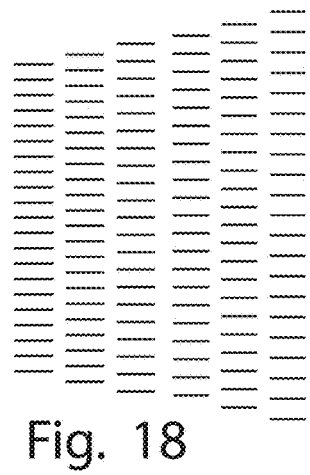
FIG. 18 illustrates another embodiment for selective grating tunability, featuring lateral variation in the grating period by means of discrete side-by-side variations.
Figure 19:
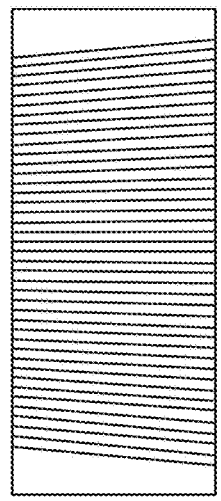
FIG. 19 illustrates another embodiment for selective grating tunability, featuring lateral variation in the grating period by means of continuous variation.

In another tuning approach, the period of the grating would be different depending on location on the grating—either varying in the longitudinal direction (known as chirp); or laterally which would either be multiple gratings fabricated side-by-side with varying periods as shown in FIG. 18, or something continuous as shown in FIG. 19.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A wavelength selective optical switch comprising
   an input optical fiber having a fiber core and a cladding and defining a first transmission path;
   the input fiber having a cladding-removed portion that facilitates access to the radially evanescent field present when optical power is propagating through the optical fiber;
   an output waveguide defining a second transmission path;
   a grating which defines a grating period that corresponds to an optical wavelength;
   the grating assisted coupler being selected from the group consisting of a grating structure incorporated into the input optical fiber or a grating structure incorporated into the output waveguide or a grating structure physically separate from and interposed between the optical fiber and the output waveguide;
   an adjustable positioning fixture configured to actuate the grating assisted coupler, between:
   a first position in which the output waveguide is held apart from the input fiber core and does not substantially interact with the evanescent field, and
   a second position in which the output waveguide is held proximate to the input fiber core and substantially interacts with the evanescent field;
   wherein the grating assisted coupler is tunable through a range of different grating periods.

2. The optical switch of claim 1 wherein the cladding-removed portion of the fiber core, the grating, and the output waveguide form a grating assisted coupler that define a wavelength selective switch that operates:
   (a) in the first position to allow optical power to propagate unperturbed through the first transmission path, including optical power at said optical wavelength;
   (b) in the second position to extract and reroute optical power at the selected optical wavelength to propagate through the second transmission path, while leaving substantially unperturbed other wavelengths propagating through the first transmission path.

3. The optical switch of claim 1 wherein the output waveguide comprises a second optical fiber.

4. The optical switch of claim 1 wherein the grating assisted coupler comprises a chip-based waveguide that incorporates a grating.

5. The optical switch of claim 1 wherein the grating assisted coupler comprises a cladding-removed Fiber Bragg Grating (FBG).

6. The optical switch of claim 1 further comprising a grating structure physically separate from and interposed between the optical fiber and the output waveguide.

7. The optical switch of claim 1 wherein apodization or a similar technique is applied to the profile of the grating such that sidelobes and ripple adjacent to the selected wavelength are suppressed.

8. The optical switch of claim 1 wherein the adjustable positioning fixture includes an actuator that changes the relative spacing of the fiber core and the output waveguide, the actuator selected from the group consisting of mechanical actuators, electro-mechanical actuators, electrically operated piezoelectric actuators, thermo-mechanical actuators, and combinations thereof.

9. The optical switch of claim 1 wherein the grating assisted coupler is tunable through a range of different grating periods using a mechanism that changes a dimension of the grating by stretching or compressing.

10. The optical switch of claim 1 wherein the grating assisted coupler is tunable through a range of different grating periods through expansion and contraction of the grating by varying the temperature of the grating.

11. The optical switch of claim 1 wherein the grating assisted coupler is tunable through a range of different grating periods through rotation of the grating relative to the fiber.

12. The optical switch of claim 1 wherein the grating assisted coupler is tunable through a range of different grating periods through tuning a physical or periodic property of the grating to change the optical wavelength.

13. The optical switch of claim 1 wherein the period of the grating assisted coupler is varied either along the axis of optical propagation (chirped) or normal to the axis of optical propagation such that the Bragg wavelength can be tuned based on the location on the grating with which the cladding-removed portion of the optical fiber makes contact.

14. A method of switching an optical signal carried by optical energy propagating through an optical fiber having a core and a cladding comprising:
 introducing propagating optical energy into an optical fiber that defines a first transmission path and that has a portion of the cladding removed to define a window supporting access to the evanescent field when the optical energy is present in the optical fiber;
 modulating the optical energy at a predefined wavelength to carry the optical signal;
 providing a waveguide that defines a second transmission path;
 forming a grating assisted coupler, with a defined grating period corresponding to the predefined optical wavelength;
 wherein the grating assisted coupler is selected from the group consisting of a grating structure incorporated into the input optical fiber, a grating structure incorporated into the output waveguide and a grating structure physically separated from and interposed between the optical fiber and the waveguide;
 permitting selective positioning of the output waveguide in a first position substantially out of the evanescent field such that substantial interaction between the output waveguide and the evanescent field does not occur;
 permitting selective positioning of the output waveguide in a second position extending into the evanescent field such that interaction between the output waveguide and the evanescent field results in switching at the optical wavelength corresponding to the grating period according to the Bragg equation;
 using the selective positioning of the output waveguide into and out of proximity with the evanescent field to effect switching:
 (a) in the first position to allow optical power to propagate unperturbed through the first transmission path, including optical power at said predefined optical wavelength;
 (b) in the second position to extract and reroute optical power at the predefined optical wavelength to propagate through the second transmission path, while leaving substantially unperturbed other wavelengths propagating through the first transmission path;
 wherein the grating period is associated with a physical property of the grating and further comprising tuning the physical property of the grating to change the grating period and thereby couple through the evanescent field with a wavelength other than the wavelength determined by the untuned grating.

15. The method of claim 14 wherein the grating period is associated with a periodic property of the grating and further comprising tuning the periodic property of the grating to change the Bragg wavelength and thereby couple through the evanescent field with a wavelength other than the wavelength determined by the untuned grating.

16. The method of claim 14 wherein the grating period is associated with a periodic pitch of the grating and further comprising tuning the pitch of the grating to change the grating period and thereby couple through the evanescent field with a wavelength other than the wavelength determined by the untuned grating.

17. The method of claim 16 wherein the pitch of the grating is tuned by effecting a physical change to the grating selected from the group consisting of: stretching, compressing, expanding, contracting, heating, cooling, rotating and changing the refractive index of the grating material.

18. The method of claim 14 wherein the period of the grating is varied either along the axis of optical propagation (chirped) or normal to the axis of optical propagation such that the Bragg wavelength can be tuned based on the location on the grating with which the cladding-removed fiber window makes contact.

* * * * *